United States Patent
Ferreira et al.

(10) Patent No.: US 12,373,019 B2
(45) Date of Patent: Jul. 29, 2025

(54) RECOMMENDATION FRAMEWORK OF MODEL AND HARDWARE FOR ENERGY-EFFICIENT MACHINE LEARNING WORKLOADS

(71) Applicant: Dell Products L.P., Round Rock, TX (US)

(72) Inventors: Victor da Cruz Ferreira, Rio de Janeiro-RJ (BR); Vítor Nascimento Lourenço, Niterói-RJ (BR); Thais Luca Marques De Almeida, São Gonçalo-RJ (BR); Claudio Romero, Rio de Janeiro-RJ (BR); Paulo Abelha Ferreira, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 128 days.

(21) Appl. No.: 18/476,186

(22) Filed: Sep. 27, 2023

(65) Prior Publication Data
US 2025/0103131 A1    Mar. 27, 2025

(51) Int. Cl.
*G06F 1/3296*    (2019.01)
*G06N 5/04*    (2023.01)
*G06N 20/00*    (2019.01)

(52) U.S. Cl.
CPC ............ *G06F 1/3296* (2013.01); *G06N 5/04* (2013.01); *G06N 20/00* (2019.01)

(58) Field of Classification Search
CPC .................................................. G06F 1/3296
See application file for complete search history.

(56) References Cited

U.S. PATENT DOCUMENTS

| | | | |
|---|---|---|---|
| 2020/0302234 A1* | 9/2020 | Walters | G06F 16/9035 |
| 2022/0035679 A1* | 2/2022 | Sunwoo | G06N 20/00 |
| 2022/0366278 A1* | 11/2022 | Liu | G06N 5/04 |

OTHER PUBLICATIONS

Lecun et al. "Gradient-based learning applied to document recognition.," Proceedings of the IEEE, vol. 86, No. 11, pp. 2278-2324, 1998.
Krizhevsky et al. "Imagenet classification with deep convolutional neural networks," Communications of the ACM, vol. 60, No. 6, pp. 84-90, 2017.

* cited by examiner

*Primary Examiner* — Simon P Kanaan
(74) *Attorney, Agent, or Firm* — Workman Nydegger

(57) ABSTRACT

One example method includes obtaining input including characteristics of a machine learning (ML) model, specifications of a hardware configuration on which the ML model has been run, and characteristics of a prospective workload, estimating, given the hardware configuration, an energy efficiency of the ML model, using a similarity measure to find peer ML models of the ML model, and each peer ML model is more energy efficient, given the hardware configuration, than the ML model, ranking the peer ML models as suggested alternatives to the ML model, storing, in a database, the characteristics of the ML model, the energy efficiency of the ML model, and the specifications of the hardware configuration, and transmitting the specifications of the hardware configuration, along with workload characteristics, to a recipient.

20 Claims, 5 Drawing Sheets

| ID | Models | Description |
|---|---|---|
| m1 | VGG-16 | 13 convolutional layers; 5 max pooling layer; 3 fully connected layers |
| m2 | AlexNet | 5 convolutional layers; 3 max pooling layers; 3 fully connected layers |
| m3 | ResNet | 34 convolutional layers |

| ID | Hardware | Description |
|---|---|---|
| h1 | PowerEdge T550 | Intel Xeon Silver 4309Y; 2x8GB, 3200MHz; 2x960GB SSD SATA RI |
| h2 | PowerEdge R7525 | AMD EPYC 7443; 1x16GB, 3200MHz; 1x480GB SSD SATA RI |
| h3 | PowerEdge T150 | Intel Xeon E-2324G; 1x16GB, 3200MHz; 1x4TB HD SATA |

| Energy-Efficiency | |
|---|---|
| (m1, h1) | 1.3 TFLOP / J |
| (m2, h3) | 1.5 TFLOP / J |
| (m3, h2) | 0.8 TFLOP / J |

FIG. 3

| Model Input | |
|---|---|
| conv2d_1 | (None, 28, 28, 32) |
| max_pooling2d_1 | (None, 14, 14, 32) |
| conv2d_2 | (None, 10, 10, 48) |
| max_pooling2d_2 | (None, 5, 5, 48) |
| dense_1 | (None, 256) |
| dense_2 | (None, 84) |
| dense_3 | (None, 10) |

| Hardware Input | |
|---|---|
| Processor | Intel Xeon E-2324G |
| RAM memory | 1 x 8GB 3200 MHz |
| SSD | 2 x 480GB SATA RI |

FIG. 4

RECOMMENDATION FRAMEWORK OF MODEL AND HARDWARE FOR ENERGY-EFFICIENT MACHINE LEARNING WORKLOADS

FIELD OF THE INVENTION

Embodiments of the present invention generally relate to energy consumption by ML (machine learning) models. More particularly, at least some embodiments of the invention relate to systems, hardware, software, computer-readable media, and methods, for determining a best possible ML model for a given hardware configuration, and identifying hardware improvements that may enable the hardware to better support a given ML model.

BACKGROUND

Machine Learning (ML) comprises a significant part of the workloads running on different computational environments. A concern with the running of ML models however is the regulatory risk of excessive consumption of energy. Thus, being able to measure, and influence, the energy consumption of customer ML workloads may have a big impact in compliance and requirements of green computing. However, there are a number of challenges in this.

For example, it is difficult, if not impossible, to fairly compare different ML models and hardware on an energy efficiency basis. As another example, it may be difficult to automatically detect excessive energy consumption of ML workloads. Finally, there is a lack of data available to support ML and hardware recommendations to improve energy efficiency.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 3 discloses examples of information that may be included in a database according to one embodiment of the invention.

FIG. 4 discloses example model input and hardware input that may be employed in an embodiment of the invention.

DETAILED DESCRIPTION OF SOME EXAMPLE EMBODIMENTS

Figure 1:
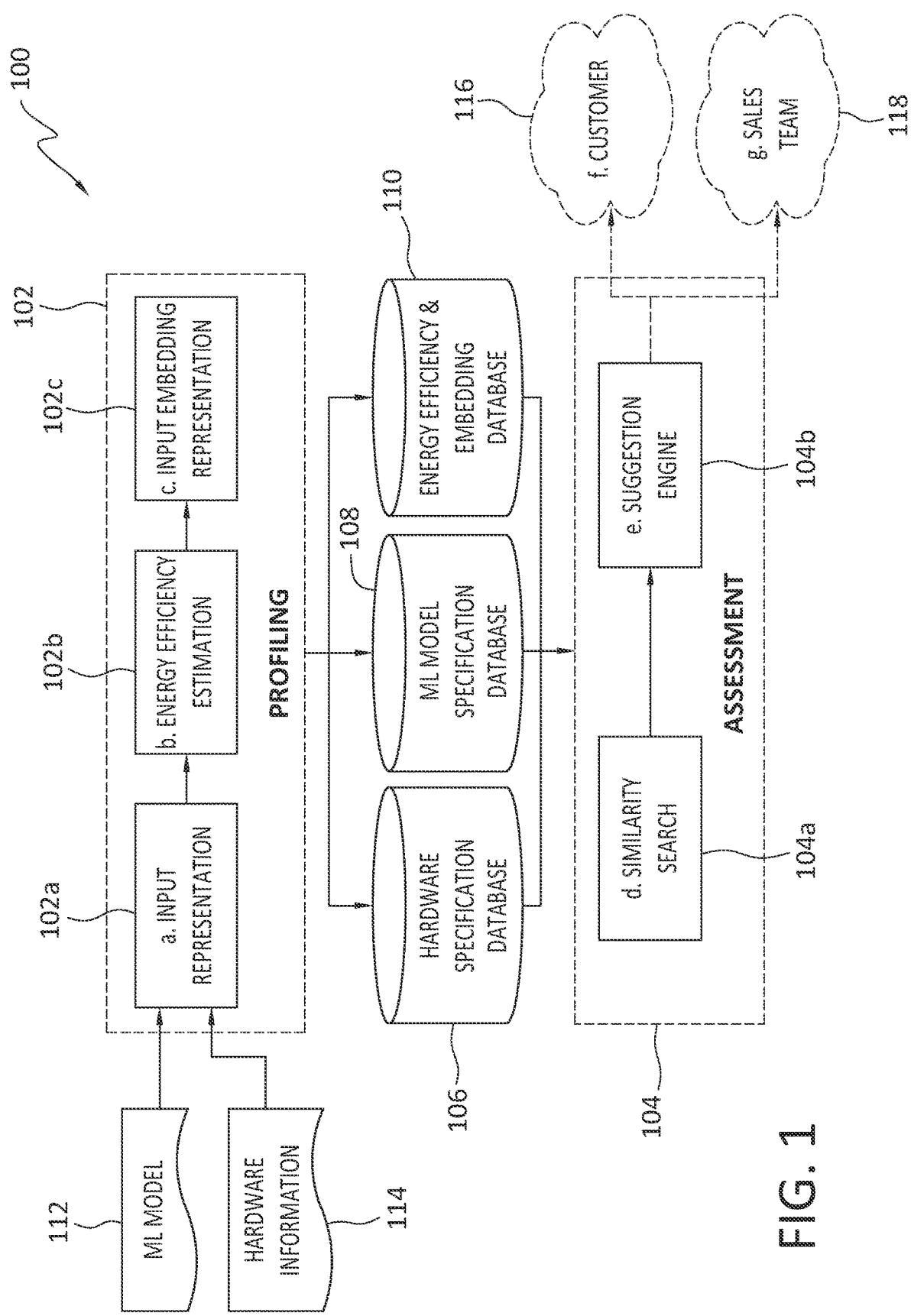
FIG. 1 discloses aspects of a framework according to one embodiment of the invention.

Embodiments of the present invention generally relate to energy consumption by ML (machine learning) models. More particularly, at least some embodiments of the invention relate to systems, hardware, software, computer-readable media, and methods, for determining a best possible ML model for a given hardware configuration, and identifying hardware improvements that may enable the hardware to better support a given ML model.

One example embodiment of the invention comprises a method and framework which may compare different ML models based on their energy efficiency and provide a fair comparison between similar models and hardware, while also warning about estimated energy efficiency metrics and gathering data to suggest improvements to the system on which the ML model(s) will be run. An embodiment of the method may comprise the following operations: [1] estimate energy efficiency based on ML model characteristics and hardware information given as input; [2] use similarity measures to find peers based on these characteristics and the system hardware to be used during the ML workload execution; [3] provide a rank of similar models as suggestions for the decision-making process of more efficient models; [4] store the model characteristics, its energy-efficiency, and the hardware specifications in a database for future comparisons; and, [5] send hardware specifications, workload characteristics, and customer information to the sales team.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that an embodiment may strike a balance between ML model performance, and the efficient use of energy by the ML model. An embodiment of the invention may generate recommendations, such as hardware modifications for example, to improve the operation of an ML model and/or the efficient use of energy by the ML model. Various other advantages of some example embodiments of the invention will be apparent from this disclosure.

A. CONTEXT FOR AN EMBODIMENT OF THE INVENTION

Hardware manufacturers usually display some efficiency metrics to show how powerful the hardware device is, but do not correlate the efficiency metrics with how well the system is being utilized. Furthermore, conventional techniques rely on using well-known benchmarks, such as specific models AlexNet, ResNet, and MobileNet, for example, that relate to the problem or have similar architecture to the ML model being compared. The energy-efficiency benchmarks are either extrapolated based on previous measurements on other hardware devices, or remeasured on the current testbed for a better comparison. Neither of these approaches enables a fair comparison between equivalent workloads and systems. Moreover, benchmarks do not provide suggestions, so the developer must manually search on the limited pool of tested models to determine why the models performed better, or worse, in terms of energy efficiency. The literature presents how carbon footprints are related to hours of training, number of processors of the hardware, and the speed and power of those processors. Moreover, some have proposed an ML emissions calculator considering the energy consumption of hardware, location of provider regions of compute and its CO2 emissions per kWh, and potential offsets bought by the provider.

B. OVERVIEW OF AN EXAMPLE EMBODIMENT

B.1 Configuration

An example embodiment of the invention comprises a framework, or platform, for comparison of ML workloads across different computing environments with the dual aims of [1] determining, if possible, the best ML model, in terms of performance, and energy efficiency, for a particular customer hardware configuration, while limiting loss on model performance, and [2] obtaining data to help suggest possibly better hardware, in terms of ML model performance and/or energy efficiency, for a given customer. Note that an ML model may also be referred to herein simply as a 'model.'

In more detail, a platform according to one embodiment of the invention compares different ML models based on their energy efficiency and provides a fair comparison between similar models and hardware while warning about estimated energy efficiency metrics and gathering data to suggest improvements to the system. Assuming that ML models can be executed in containers, that is, executed in a way that they are isolated from other processes, the platform measures power consumption of ML models to infer energy efficiency. An embodiment may further assume independency between complexity of the task, and the models themselves.

The platform may provide a rank relating the current model to similar ones by using similarity measures based on the model characteristics and the system hardware used during the ML workload execution. Models in the rank are suggestions on how the current model can be improved, along with information of how efficient that model might be in terms of energy consumption.

Thus, a platform and method according to an example embodiment of the invention may comprise various operations. Such operations may include, but are not limited to: [1] estimating energy efficiency based on ML model characteristics and hardware information given as input; [2] using similarity measures to find peers based on these characteristics and the system hardware to be used during the ML workload execution; [3] providing a rank of similar models as suggestions for the decision-making process of more efficient models; [4] storing the model characteristics, its energy-efficiency, and the hardware specifications in a database for future comparisons; and [5] sending hardware specifications, workload characteristics, and customer information to the sales team.

Thus, an embodiment of the invention may, among other things, (a) improve the efficiency with which energy is used by the execution of an ML model, and (b) enable recommendations concerning, and implementation of, hardware changes to better support execution of an ML model in terms of energy efficiency and/or model performance. To these ends, an embodiment may provide for orchestration of the estimation, comparison and suggestion of model and hardware into a single framework that considers energy requirements and consumption, and may provide a unified database for comparison among models, which is based on an embedding similarity measure.

B.2 Embedding and Latent Spaces

Reference is made herein to embedding processes and latent spaces. In general, the use of a latent space may reduce the dimensionality of a set of data. This reduction may be considered as a form of data compression. The use of the latent space may be particularly helpful in cases where it may be difficult, or impossible, to learn or draw useful conclusions from the raw data of the data set. The encoding of the high dimensional raw data into the latent space to create a low dimension representation of the raw data may be referred to as embedding.

Advantageously, the latent space with its embedded information may capture useful information about relationships between/among the raw data. For example, data samples of the raw data that are similar to each other in some way may be positioned correspondingly close to each other in the latent space. The general concepts of embedding and latent spaces will be readily understood by a person of ordinary skill in the art.

C. DETAILED DISCUSSION OF AN EXAMPLE EMBODIMENT

As noted earlier herein, an embodiment of the invention comprises a framework, or 'recommendation framework,' that generates suggestions of model and hardware modifications to enhance energy efficiency of ML workloads. For example, whenever a new ML workload is submitted, framework may leverage the workload description, as well as the hardware in which the workload will be executed, to estimate the energy efficiency of the ML workload and propose modifications to optimize the energy consumption by the ML workload, based on previously known workloads. Thus, an embodiment of the invention may comprise orchestration and estimation of energy efficiency of ML workloads, generation of a searchable and comparable workload representation, and generation of recommendations that enhance the ML workload energy efficiency.

With attention now to FIG. 1, an overview of various processes in an embodiment of the invention is disclosed. In an embodiment, one or more of these processes may take place in an edge computing environment. For the purposes of explanation, FIG. 1 assumes a typical cloud-edge network structure for ease of explanation, but the scope of the invention is not limited to that particular topology.

As shown in FIG. 1, an example framework 100 according to one embodiment of the invention may comprise a profiling component/process 102, and an assessment component/process 104. The framework 100 may also comprise various databases, such as a hardware specification database 106, an ML model specification database 108, and an energy efficiency and embedding database 110. In an embodiment, the framework 100 may comprise its own dedicated ML model which may be used to perform any of the operations of the framework 100, including generating estimates of energy efficiency.

In an embodiment, the framework 100 may receive, as inputs, a saved ML model file 112, which may eventually be transformed into a model description file, and a hardware description file 114 which may also comprise information gathered from an OS (operating system). As discussed below, there may be two processes running at a given client at the edge, namely, a profiling process, and an assessment process.

The profiling process 102 may employ a set of models and associated hardware specifications that may be represented by an input representation 102a in various ways, as discussed below. Although an embodiment may not expect the hardware of the client, an embodiment may change or limit certain specifications, such as the use of CPU/GPU (central processing unit/graphics processing unit) for example, to target profiling. An embodiment of the invention may assume a small profiling program is deployed to each participating client and this profiling program may run a set of models on the client hardware, according to specifications, and output related metrics.

A metric of particular interest in one embodiment is energy efficiency, although other metrics may also be gathered, such as, but not limited to, running time, and errors. One example embodiment of the invention may focus on energy efficiency, particularly, an estimation 102b of energy efficiency, and therefore consider only a power consumption metric, and a number of operations metric. The final operation 102c of the profiling process 102 may comprise the use of an ML model capable of learning an embedding space from the model and hardware description.

An example embodiment of the invention may assume there is an available database 106 to store and retrieve information about models and hardware. The database 106 may initially be populated with reliable benchmarks and other ML model solutions. This provides a starting point before widespread adoption of the service. Every new customer that uses the framework 100 may further populate the database 106 with their own hardware specifications, and similarly populate the databases 108 and 110 with customer-specific information. The database 106 may store information on hardware, the database 108 may store information about ML model specifications, and the database 110 may store information about the embeddings (in a latent space), and their corresponding energy efficiency. In an embodiment, the databases 106, 108, and 110 may be integrated together to form a single database. Finally, it is noted that use of a standard metric to calculate energy efficiency may overcome the lack of a unified comparison metric since all suggestions and comparisons may be evaluated through the same pipeline.

With continued reference to the example of FIG. 1, the assessment process 104 may use the information stored in the databases 106, 108, and 110 to, first, perform a similarity search 104a to match the input model and hardware with similar configurations based on the learned embeddings, and then, the suggestion engine 104b may identify, based on the results of the similarity search 104a, opportunities to improve the current input, providing model and hardware modification suggestions. Finally, the framework 100 may share the model improvement suggestions with one or more customers 116, and share the hardware improvement suggestions with a sales team 118. More generally, the model improvement suggestions and hardware improvement suggestions may be shared with any other parties or entities, and the foregoing are provided only by way of example.

Conventional approaches that rely only on benchmarks or other works reported energy efficiency are extremely unreliable due to the limited information access regarding the system hardware or model characteristics. This causes divergences in measurement which can lead to false perceptions regarding expected energy efficiency. In contrast, a framework, such as the framework 100 for example, according to one example embodiment of the invention May resolve this problem by continuously adding new information to the base. Moreover, new user information may enable the framework to keep up with new trends and innovations for both hardware accelerators and ML techniques.

C.1 Estimation and Description Representation

C.1.1 Input Description and Representation

The first step or operation in an example embodiment of a profiling operation 102 may comprise obtaining or generating an input description and representation, as denoted at 102a in FIG. 1. In an embodiment, a framework, such as the framework 100, may require information from an ML model, as well as information about the system hardware on which the ML model is run. Both types of information may be retrieved from different respective sources, and processed as described below.

In an embodiment, the ML model information may be derived from the saved model specification, which is provided as an input for the framework. This model specification is not necessarily tied to any deep learning library. Thus, an embodiment may assume a canonical model specification, which is reasonable given that many of these libraries have ways of translating model specifications from one to the other. The framework may also inquire on other types of information about the model, such as quantization and pruning information. The resultant representation may take the form of a DAG (directed acyclic graph) that encodes the relationship among variables, such as layers for example, and their properties. The user may confirm or provide additional information about techniques used to optimize the ML model. Note that, although some parameters are important, an embodiment may require only the model specification and not its weights.

Hardware information, such as may be stored in the database 106, may, in an embodiment, be retrieved from the OS and BIOS (basic input output system) of the hardware, and represented in a structured manner in the database 106, which may comprise a relational database. Unlike the ML model description, where the prompt works for checking and additional information, a user prompt for the hardware may be required. The purpose of the prompt is not only for checking hardware information, but for the user to specify which hardware components are being used to execute the ML workload. For example, a system may have 4 GPUs, but the ML model executions are limited to one GPU or CPU only. This information is important to accurately calculate the energy efficiency of the system. Initially, both descriptions may be used together for energy efficiency estimation, and then later they are converted into embeddings and may be accessed by the suggestion algorithm.

C.1.2 Energy Efficiency Estimation and Energy Consumption

The second step or operation in an example embodiment of a profiling operation 102 may comprise generating an energy efficiency estimate, referenced at 102b in FIG. 1, and an energy consumption estimate. In an embodiment, energy efficiency is defined as the ratio of a performance metric versus the energy consumed. Examples of performance metrics are frames per second, queries per second and FLOP per second (FLOPS), while power consumption is typically measured in watts (W), instead of energy consumption in joules (J). There are different ways of measuring the power consumption of a system, such as the Dell iDrac, internal power sensors, and external power meter equipment, for example. To perform a comparison between different devices, their respective energy efficiencies may be estimated in FLOP/J.

Precisely quantifying energy efficiency of a system when running an ML model may be difficult due to several factors such as: many processes may be running in parallel; there may be difficulties in isolating the ML workload; and, there may be a huge variety of hardware specifications and others. Thus, one embodiment of the invention may rely on having the model files (see 112 in FIG. 1) to profile the system, and the framework may execute within the same system in which the ML model will be implemented and run.

In an embodiment, the framework measures energy efficiency by performing inference with random data using the given model on the system hardware. Since the framework is aware of the model input size, the system creates several random input batches as model accuracy does not matter to estimate energy-efficiency. For example the Dell iDrac collects power consumption data before the execution of the inferences to form a baseline measurement. Afterwards, the inference workload of the ML model starts, and power consumption information is collected similarly. Thus, subtracting the baseline power consumption from the inference power consumption may give a close estimate of power consumption by the ML model.

In an embodiment, the number of FLOPS used by a ML model during inferencing may be inferred through [1] the ML model architecture, or using third party libraries, and [2] the duration of the inference. The final operation may be to divide the total amount of FLOPS, by the estimated power consumption (in watts) of the ML model, to obtain an energy efficiency metric in the form of FLOP/J. This energy efficiency metric may be saved in a database, such as the database 110, alongside the model and hardware information.

C.1.3 Input Embedding Representation

The third step or operation in an example embodiment of a profiling operation 102 may comprise using ML models with a mathematical form $f_\theta$ to generate an input embedding representation, an example of which is referenced at 102c in FIG. 1. The purpose of such ML models in this form may be twofold:

[1] learn a mathematical space, such as a so-called distributional, latent, or embedding space, where the heterogenous relationship among the input, that is, the relationship of the ML model DAG, and the hardware structure information, may be numerically computed; and

[2] infer the embedding of existing or new entities and representations.

To this end, the following explanation is provided of the embedding function $f_\theta$, as stated in this equation:

$$X_i = f_\theta(m_i, h_i) = W(GNN(m_i) \oplus MLP(h_i)), X_i \in R^D,$$

where $X_i$ is the resultant embedding of subjecting a new entry i, $(m_i, h_i)$ are, respectively, the ML model DAG, and the hardware description, that is, in the entry i, $m_i$ corresponds to the DAG of the ML model, while $h_i$ corresponds to the hardware description. The embedding function $f_\theta$ is defined by the concatenation $\oplus$ of the embedded representation of the model DAG $m_i$ generated by a graph-based ML model such as a GNN (graph neural network), with the resulting vector representation of the employment of an MLP (multilayer perceptron) over the concatenation of the hardware $h_i$. Finally, the resultant k-dimensional concatenated vector is submitted to a linear transformation W capable of mapping that k-dimensional concatenated vector to a D-dimensional embedding $X_i$.

By approaching the problem this way, an embodiment of the invention may reduce the computational burden for online operation while still preserving statistically relevant information for downstream evaluation. It is noted that there are various ways to learn a latent representation from data, such as graph, tabular, and numerical. The aforementioned formulation is provided only by way of example, and is one of various possible embodiments that may be used to encode the input into its embedding representation.

C.2 Similarity Search

Given the learned space discussed above, similar pairs of model and hardware may be identified, such as by a similarity search engine, an example of which is referenced at 104a in FIG. 1. In this regard, one example embodiment envisions the use of a distance function, such as cosine distance for example, on the embeddings to measure similarity between the inputs. Like so, an embodiment may define those two inputs $(m_i, h_i)$ and $(m_j, h_j)$ as similar if their respective representations $X_i$ and $X_j$ are close to each other in the latent space, given a closeness threshold o. This formulation is depicted in the following equation:

$$similar(i, j; \sigma) = dist(X_i, X_y) < \sigma,$$

where $(m_i, h_i) \in i$, $(m_j, h_j) \in j$, and dist is any distance function able to operate in the same geometry from the previously learned latent space, such as any Euclidian-based distance function.

C.3 Suggestion Engine

In an embodiment, the suggestion engine, an example of which is referenced at 104b in FIG. 1, works by first identifying a group of similar entries in the framework database(s) 106, 108, 110, and then selecting characteristics among those with relatively better energy efficiency than the input tuple $(m_i, h_j)$. An embodiment may begin by identifying a set of entries similar to the input tuple $(m_i, h_i)$ by using the similarity search algorithm described in the previous section. This set of entries may be referred to as the 'comparison set.'

Once the comparison set is identified, the framework may compare the efficiency of all its entries with that of the input tuple, and then select up to T top entries with higher efficiency than the given input. The value of T may correspond to the maximum number of entries that will be used to generate the suggestions, this value could be user defined or alternatively considered as a hyperparameter.

Given this set of (up to) T entries, which may be referred to as the 'suggestion set,' the framework looks for the hardware and model characteristics associated with each entry. For example, what type, if any, quantization was used, what type, if any, pruning technique was used, and what type of hardware was used. These characteristics of the suggestion set are compared to the input, and the differences between the input and the suggestion set become the suggestions.

An embodiment may present the model characteristics of the most efficient entry (top 1), and the suggestions further refined by identifying, and presenting, model characteristics that are common among the majority of the suggestion set. All these characteristics may then be presented to the user as possible suggestions on how to change the ML model to improve energy efficiency of the executing ML model. An embodiment may also present to the user the current ranking of the input model in regard to the similarity search result.

If L is defined as the number of entries in the suggestion set and K as the number of entries in the comparison set, then $0 \leq L \leq T \leq K$, note that when L=T=K the current input tuple has the worst efficiency out of all the similar tuples in the database and, alternatively, when L=0, signifying an empty suggestion set, the current input has the highest efficiency, or the database does not contain a similar tuple. For the latter case, no model and hardware suggestions may be available. Increasing the value of o could potentially generate a larger comparison set which could return a non-empty suggestion set. This can be dynamically adjusted, for example by letting the user set o at the risk of generating a less relevant comparison set, insofar as o indicates the relative closeness of elements of the latent space.

For hardware suggestions, the framework may evaluate the suggestion set by checking for hardware differences between the input and each entry. Unlike the model suggestions, this information may be saved and not immediately externalized. At the end of a fixed period, the framework may aggregate the most recent hardware suggestions and compile a set of metrics regarding which hardware is being used, and what is the most efficient hardware for each customer. This report may be externalized to a recipient, such as a sales team, for further evaluation and decision making.

By identifying the respective tuples of the ML models with better energy efficiency, an embodiment may provide an automated methodology for detecting possible excessive power consumption, as well as generating suggestions that could improve energy efficiency.

D. EXAMPLES

Figure 2:
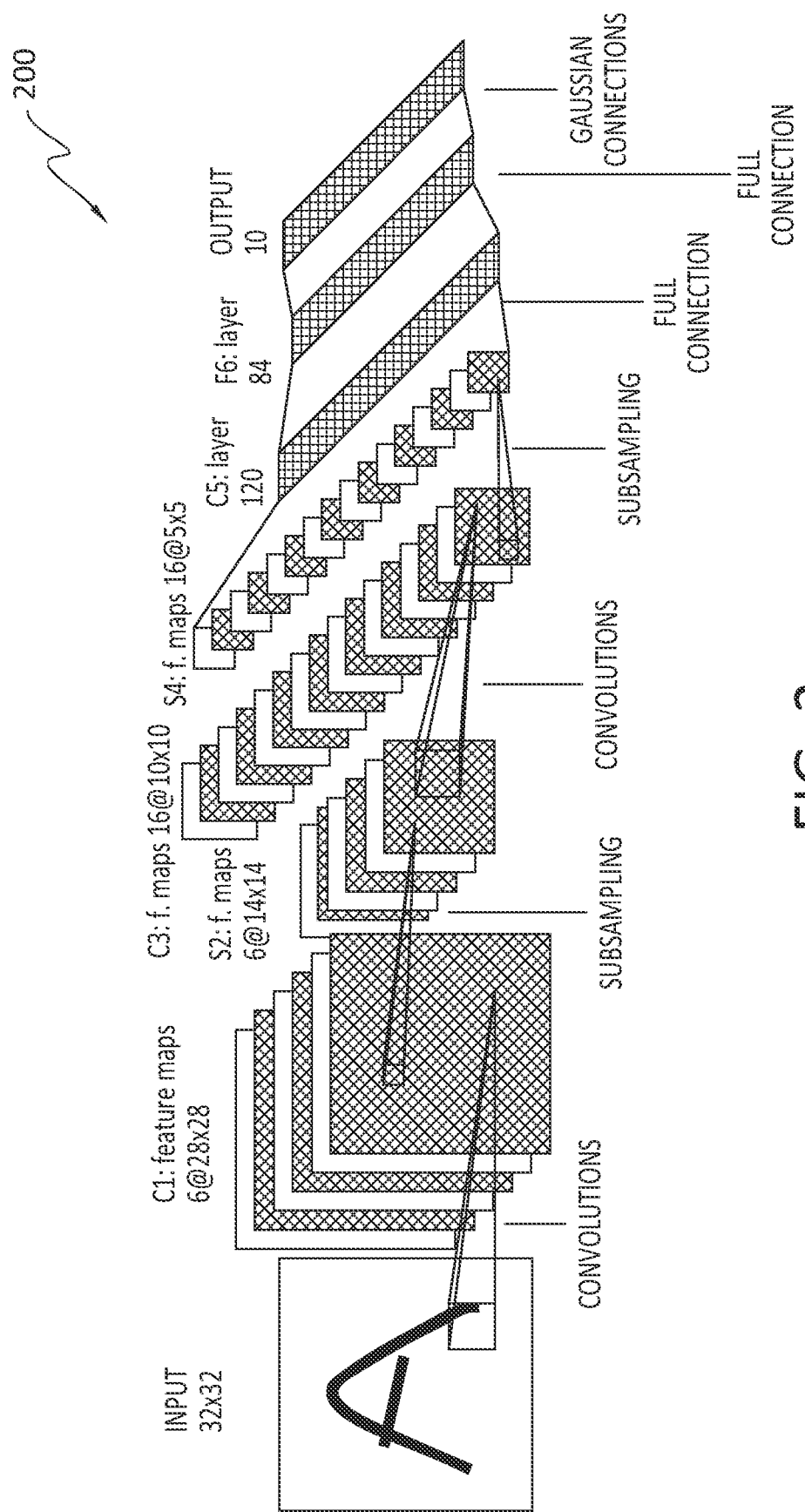
FIG. 2 discloses aspects of an example convolutional neural network (CNN).

In this section, an example is presented, with reference to the architecture 200 of LeNet-5 disclosed in FIG. 2, of the proposed recommendation framework by considering the following scenario:

A company wants to implement a service to automate number recognition for identifying telephone numbers in resumes. It is reasonable to assume it relies on Convolutional Neural Networks (CNNs) that are well suitable to image recognition tasks such as LeNet-5. As described in FIG. 2, the CNN has 6 layers: three sets of convolution layers connected to max pooling layers, and three fully connected layers. A SoftMax function is used to classify images into their respective classes. The input to this model is a grayscale image with one channel (32×32×1). The company uses a PowerEdge Tower T350 with an Intel Xeon E-2324G, 8 GB RAM memory and 480 GB SSD to perform number recognition.

Assume the system database is already filled with some information 300 regarding other models, hardware, and their respective energy efficiencies, as shown in FIG. 3. Hence, following the process described in section C (and its subsections):

1. An embodiment of the framework may gather data from the system hardware and receives a version of the model as the input tuple ($m_4$, $h_4$). FIG. 4 discloses a simple example of model input and hardware input, collectively referenced at 400, to illustrate the methodology—in a real-world scenario, models and hardware may have more information in their specifications;
2. The framework performs some inference rounds with random data using the input size as baseline to estimate how energy-efficient the model is for the given hardware. In this example, 1.2 TFLOP/J;
3. The embedding representation $X_{4,4}$ for both model and hardware is generated for the input ($m_4$, $h_4$);
4. Calculates the distance between $X_{4,4}$ to the other embeddings presented in the database—assume the embedding $X_{i,j}$ is derived from $f_\theta$ ($m_i$, $h_j$) for available entries in the database;
5. Assume the threshold value $\sigma=1.0$ and the distance between the input embedding $X_4$ to the other values on the table are dist($X_{1,1}$, $X_{4,4}$)=0.6, dist($X_{2,3}$, $X_{4,4}$)=0.2, dist($X_{3,2}$, $X_{4,4}$)=1.5. In this scenario, the LeNet-5 model is closer in the space of embeddings to AlexNet, which has five convolutional layers with max pooling and three fully connected layers. Also, PowerEdge T350 hardware configuration is closer to PowerEdge T150. In this case, dist($X_{3,2}$, $X_{1,4}$)=1.5>$\sigma$, so ResNet does not belong to the comparison set. Thus, given the process described herein, the comparison set in this illustrative example is formed by:

$$\{(AlexNet, PowerEdge\,T150, 1.5\,TFLOP/J),$$
$$(VGG-16, PowerEdge\,T550, 1.3\,TFLOP/J)\};$$

6. In this example, all entries from the comparison set have greater energy efficiency than the input, thus, the system adds every entry to the suggestion set; and
7. An embodiment of the framework compiles a set of metrics regarding the hardware being used and the most efficient for the customer and sends this information to the sales team or other recipient.

Continuing with the immediately preceding example, the tuple ($m_4$, $h_4$), embedding $X_4$, and energy efficiency (1.2 TFLOP/J), may be saved into the database, for use in contributing to any further evaluations by any customers. This approach also enables the database to be constantly updated for any new hardware and model trends. The customer can accept the framework suggestions and submit a new tuple to restart the cycle. Finally, the sales team may receive important telemetry information and may reach out to this, and similar, customers with a targeted hardware platform, improving chances of selling.

E. EXAMPLE METHODS

Figure 5:
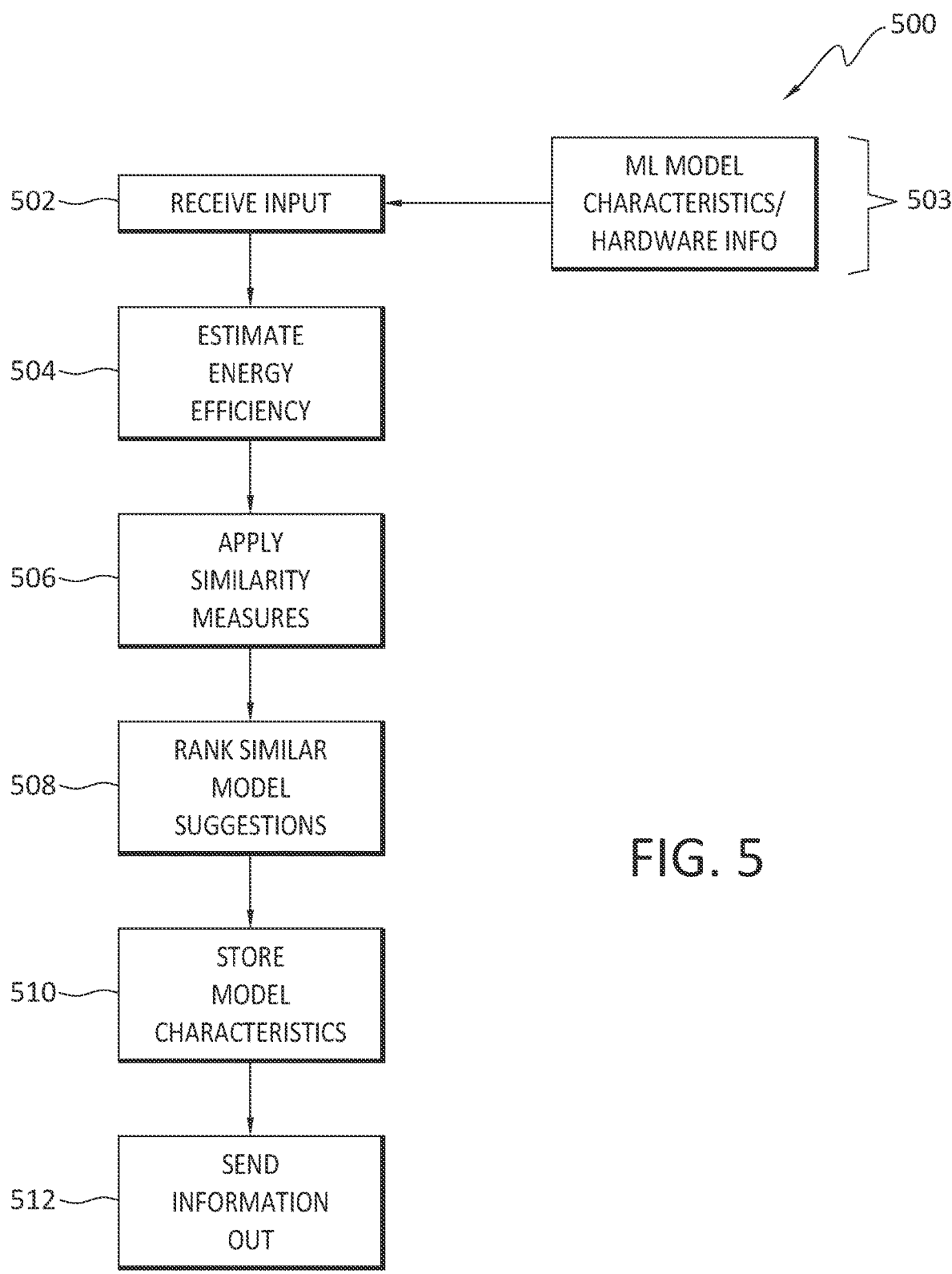
FIG. 5 discloses an example method according to one embodiment of the invention.

It is noted with respect to the disclosed methods, including the example method of FIG. 5, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 5, a method according to one example embodiment is referenced at 500. The example method 500 may begin at 502 with the receipt of input 503, which may comprise ML model characteristics, and hardware information. Based on the input 503, an estimate of energy efficiency may be generated 504.

Next, similarity measures may be used 506 to find peers based on these characteristics and the system hardware to be used during the ML workload execution. Using the similarity measures, a rank of similar models may be provided 508 as suggestions for the decision-making process of more energy efficient ML models.

The characteristics of the various models, the energy-efficiency of the models, and the hardware specifications, may be stored 510 in a database for future comparisons. Finally, the hardware specifications, workload characteristics, and customer information, may be sent 512 to the sales team or other recipient for use in deciding whether changes should be made to the hardware and/or to the ML models running on the hardware.

F. FURTHER EXAMPLE EMBODIMENTS

Following are some further example embodiments of the invention. These are presented only by way of example and are not intended to limit the scope of the invention in any way.

Embodiment 1. A method, comprising: obtaining input comprising characteristics of a machine learning (ML) model, specifications of a hardware configuration on which the ML model has been run, and characteristics of a prospective workload; estimating, given the hardware configuration, an energy efficiency of the ML model; using a similarity measure to find peer ML models of the ML model, and each peer ML model is more energy efficient, given the hardware configuration, than the ML model; ranking the peer ML models as suggested alternatives to the ML model, wherein the alternatives comprise another version of the ML model, and/or a modification of the original model generated by a process that comprises pruning, or quantizing; storing, in a database, the characteristics of the ML model, the energy efficiency of the ML model, and the specifications of the hardware configuration; and transmitting the specifications of the hardware configuration, along with workload characteristics, to a recipient.

Embodiment 2. The method as recited in any preceding embodiment, wherein the estimating comprises an inferencing process.

Embodiment 3. The method as recited in any preceding embodiment, wherein the similarity measure is calculated using a distance function.

Embodiment 4. The method as recited in any preceding embodiment, wherein the specifications of the hardware configuration, along with the characteristics of the prospective workload, enable the recipient to select one of the peer ML models and achieve a level of energy efficiency that is higher than the energy efficiency of the ML model.

Embodiment 5. The method as recited in any preceding embodiment, wherein the specifications of the hardware configuration are matched with respective specifications of alternative hardware configurations, and the specifications of the alternative hardware configurations are then presented to the recipient for selection.

Embodiment 6. The method as recited in any preceding embodiment, wherein the peer ML models are ranked according to their respective energy efficiency, and the peer ML models form a suggestion set that is a subset of a comparison set.

Embodiment 7. The method as recited in any preceding embodiment, wherein the energy efficiency of the ML model is expressed as floating point operations (FLOPs) per joule.

Embodiment 8. The method as recited in any preceding embodiment, wherein the input comprising characteristics of a machine learning (ML) model is in the form of a directed acyclic graph (DAG).

Embodiment 9. The method as recited in any preceding embodiment, wherein the specifications of the hardware configuration are obtained from an operating system and a basic input output system (BIOS).

Embodiment 10. The method as recited in any preceding embodiment, wherein the input is obtained from a database that includes, for the ML model and for each of the peer ML models, a respective tuple $(m_i, h_j)$, embedding $X_{i,j}$, and energy efficiency.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
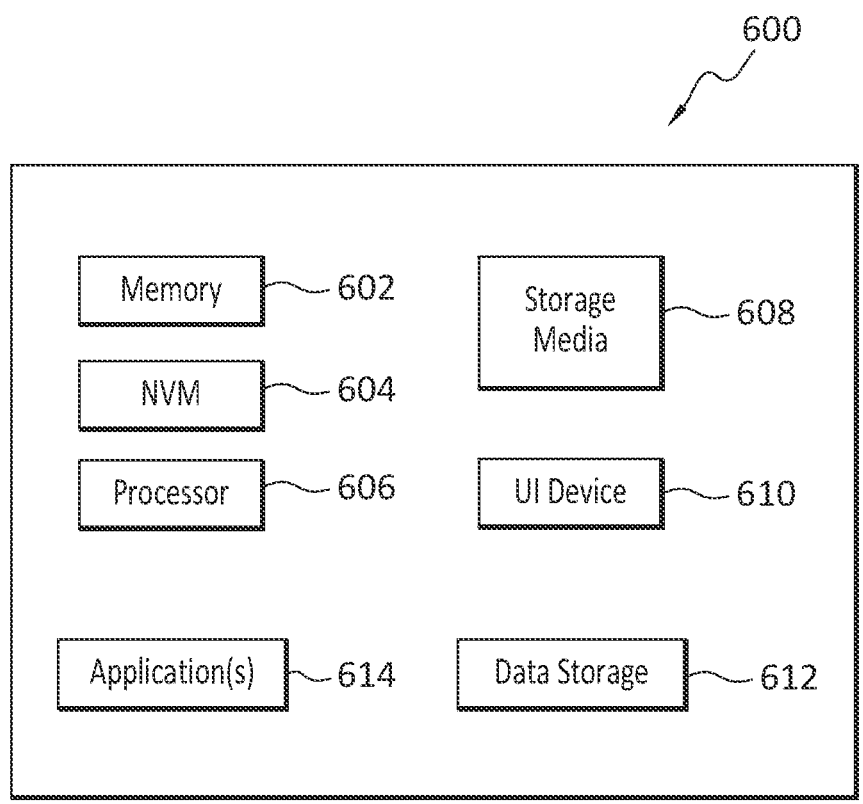
FIG. 6 discloses aspects of an example computing entity operable to perform any of the disclosed methods, processes, steps, and operations.

With reference briefly now to FIG. 6, any one or more of the entities disclosed, or implied, by FIGS. 1-5, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
obtaining input comprising characteristics of a machine learning (ML) model, specifications of a hardware configuration on which the ML model has been run, and characteristics of a prospective workload;
estimating, given the hardware configuration, an energy efficiency of the ML model;
using a similarity measure to find peer ML models of the ML model, and each peer ML model is more energy efficient, given the hardware configuration, than the ML model;
ranking the peer ML models as suggested alternatives to the ML model, wherein the alternatives comprise another version of the ML model, and/or a modification of the ML model generated by a process that comprises pruning, or quantizing;
storing, in a database, the characteristics of the ML model, the energy efficiency of the ML model, and the specifications of the hardware configuration; and
transmitting the specifications of the hardware configuration, along with workload characteristics, to a recipient.

2. The method as recited in claim 1, wherein the estimating comprises an inferencing process.

3. The method as recited in claim 1, wherein the similarity measure is calculated using a distance function.

4. The method as recited in claim 1, wherein the specifications of the hardware configuration, along with the characteristics of the prospective workload, enable the recipient to select one of the peer ML models and achieve a level of energy efficiency that is higher than the energy efficiency of the ML model.

5. The method as recited in claim 1, wherein the specifications of the hardware configuration are matched with respective specifications of alternative hardware configurations, and the specifications of the alternative hardware configurations are then presented to the recipient for selection.

6. The method as recited in claim 1, wherein the peer ML models are ranked according to their respective energy efficiency, and the peer ML models form a suggestion set that is a subset of a comparison set.

7. The method as recited in claim 1, wherein the energy efficiency of the ML model is expressed as floating point operations (FLOPs) per joule.

8. The method as recited in claim 1, wherein the input comprising characteristics of a machine learning (ML) model is in the form of a directed acyclic graph (DAG).

9. The method as recited in claim 1, wherein the specifications of the hardware configuration are obtained from an operating system and a basic input output system (BIOS).

10. The method as recited in claim 1, wherein the input is obtained from a database that includes, for the ML model and for each of the peer ML models, a respective tuple ($m_i$, $h_j$), embedding $X_{i,j}$, and energy efficiency.

11. A non-transitory storage medium having stored therein instructions that are executable by one or more hardware processors to perform operations comprising:
obtaining input comprising characteristics of a machine learning (ML) model, specifications of a hardware configuration on which the ML model has been run, and characteristics of a prospective workload;
estimating, given the hardware configuration, an energy efficiency of the ML model;
using a similarity measure to find peer ML models of the ML model, and each peer ML model is more energy efficient, given the hardware configuration, than the ML model;
ranking the peer ML models as suggested alternatives to the ML model, wherein the alternatives comprise another version of the ML model, and/or a modification of the ML model generated by a process that comprises pruning, or quantizing;
storing, in a database, the characteristics of the ML model, the energy efficiency of the ML model, and the specifications of the hardware configuration; and
transmitting the specifications of the hardware configuration, along with workload characteristics, to a recipient.

12. The non-transitory storage medium as recited in claim 11, wherein the estimating comprises an inferencing process.

13. The non-transitory storage medium as recited in claim 11, wherein the similarity measure is calculated using a distance function.

14. The non-transitory storage medium as recited in claim 11, wherein the specifications of the hardware configuration, along with the characteristics of the prospective workload, enable the recipient to select one of the peer ML models and achieve a level of energy efficiency that is higher than the energy efficiency of the ML model.

15. The non-transitory storage medium as recited in claim 11, wherein the specifications of the hardware configuration are matched with respective specifications of alternative hardware configurations, and the specifications of the alternative hardware configurations are then presented to the recipient for selection.

16. The non-transitory storage medium as recited in claim 11, wherein the peer ML models are ranked according to their respective energy efficiency, and the peer ML models form a suggestion set that is a subset of a comparison set.

17. The non-transitory storage medium as recited in claim 11, wherein the energy efficiency of the ML model is expressed as floating point operations (FLOPs) per joule.

18. The non-transitory storage medium as recited in claim 11, wherein the input comprising characteristics of a machine learning (ML) model is in the form of a directed acyclic graph (DAG).

19. The non-transitory storage medium as recited in claim 11, wherein the specifications of the hardware configuration are obtained from an operating system and a basic input output system (BIOS).

20. The non-transitory storage medium as recited in claim 11, wherein the input is obtained from a database that includes, for the ML model and for each of the peer ML models, a respective tuple ($m_i$, $h_j$), embedding $X_{i,j}$, and energy efficiency.

* * * * *